June 8, 1965 L. E. ROBERTS 3,188,599

ELECTRICAL CONNECTOR FOR PRINTED CIRCUIT BOARD

Filed Nov. 2, 1962

INVENTOR.
LINCOLN E. ROBERTS
BY
Curtis, Morris & Safford

United States Patent Office 3,188,599
Patented June 8, 1965

3,188,599
ELECTRICAL CONNECTOR FOR PRINTED CIRCUIT BOARD

Lincoln E. Roberts, Harrisburg, Pa., assignor to AMP Incorporated, Harrisburg, Pa.

Filed Nov. 2, 1962, Ser. No. 235,034
2 Claims. (Cl. 339—17)

In circuit-building techniques, it is frequently necessary to secure components to printed circuit boards. These components usually have lead wires emanating from the components for connection with a circuit on the board.

It is an object of this invention to provide an electrical connector which may be secured to a printed circuit board, which will permit insertion of the lead wire from a component in such a manner that the lead wire may be easily fitted into the connector or withdrawn therefrom. The connector is designed to provide maximum contact pressure on the lead wire, regardless of the number of insertions.

It is also an object of this invention to provide such a connector which will receive a large range of tolerances of the lead wires without damaging the connector.

It is a further object of this invention to provide an electrical connector, of the type described, for insertion into a printed circuit board, which is subsequently solder-dipped wherein the connector precludes the solder from being drawn into the wire-receiving means by capillary action.

Other objects and attainments of the present invention will become apparent to those skilled in the art upon a reading of the following detailed description when taken in conjunction with the drawings in which there is shown and described an illustrative embodiment of the invention; it it to be understood, however, that this embodiment is not intended to be exhaustive nor limiting of the invention but is given for purposes of illustration in order that others skilled in the art may fully understand the invention and the principles thereof and the manner of applying it in practical use so that they may modify it in various forms, each as may be best suited to the conditions of a particular use.

Figure 1:
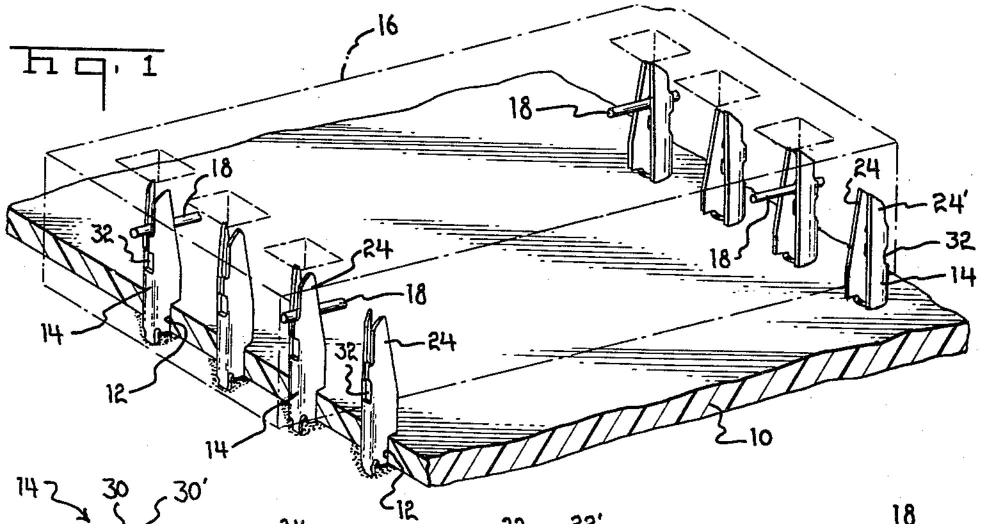
FIGURE 1 is a perspective view of a plurality of connectors, embodying the principles of this invention, secured to a printed circuit board, and illustrating a component (shown in phantom) having leads which are received by the connector.

As shown in FIGURE 1, a printed circuit board 10 may have a plurality of apertures 12 capable of receiving connector members 14. These connectors are spaced in a parallel arrangement so that a component 16 may be stationed between opposed sets, and lead wires 18 on the component will be received by the connectors 14. Since all the connectors are identical, only one need be described.

Figure 2:
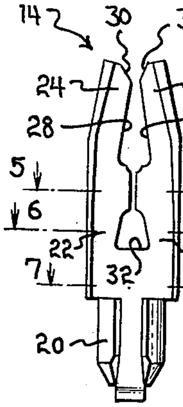
FIGURE 2 is a front plan view of a connecter of the type shown in FIGURE 1.
Figure 3:
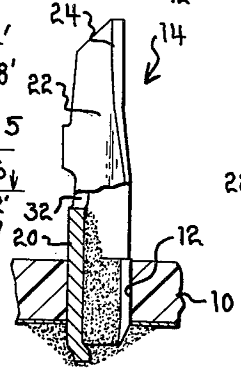
FIGURE 3 is a side plan view similar to FIGURE 2, but partially broken away.

A connector employing the principles of this invention, as shown in FIGURES 2 and 3, may be made of any suitable material, e.g., brass, etc. The connector may be stamped out of sheet metal and rolled up to form a base 20, a body portion 22, 22′ and finger means 24, 24′.

Figure 9:
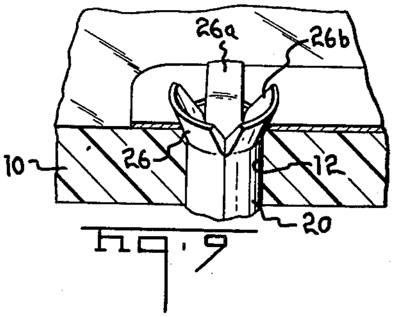
FIGURE 9 is a cut-away view of one end of the connector upon being inserted into the board prior to solder-dipping.
Figure 10:
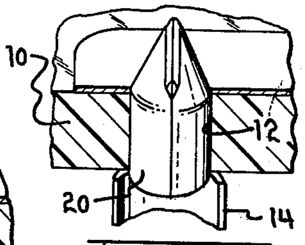
FIGURE 10 is a view similar to FIGURE 9 showing an alternative method of retaining the end of the connector in the board prior to solder-dipping.

The base 20 is comprised of a ferrule-forming portion which may be made to a diameter constituting an interference-fit with the aperture 12 of the printed circuit board 10. In this configuration, the connector may be held in the board by friction, prior to solder-dipping the board. Alternatively, the portion of the ferrule remote from the body member may be pinched on the opposite side of the board (FIGURE 10) so that it is diametrically extended to retain it in the board. The third alternative is shown in FIGURE 9, wherein the bottom of the ferrule is split into three portions, 26, **26*a* and 26*b***. The split portions of the ferrule may be bent over to stake the ferrule to the bottom of the board. This will retain the ferrule in place during the solder-dipping operation.

Figure 4:
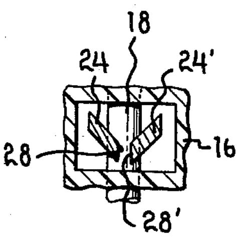
FIGURE 4 is a sectional view, taken through plane 4—4 of FIGURE 8.

The conductor-receiving portion of the connector comprises a pair of finger-like portions 24, 24′. As shown in FIGURE 4, the stamping is formed with the fingers relatively close together near the front end and divergently taper toward the body portion. The inside surfaces 28, 28′ of the fingers 24, 24′ are parallel to each other (FIGURE 4) to receive the conductor 18, i.e., these surfaces are parallel at the intersections of planes normal to the longitudinal axis of the connector to provide line contact with the conductor which provides increased contact area. As can be discerned, surfaces 28, 28′ are disposed at about 45° with respect to the inner and outer surfaces of fingers 24, 24′. Also, the front end of the fingers 30, 30′ (FIGURE 2) are profiled to provide a lead-in angle for the conductor 18.

Again directing attention to FIGURE 2, the space between the conductor-receiving edges 28, 28′ which diverges from the lead-in end toward the body portion of the connector is designed so that the apex of the angle is considerably less than the diameter of the conductor that it is to receive. At their widest spacing, the distance between them is slightly less than the diameter of the conductor.

Figure 8:
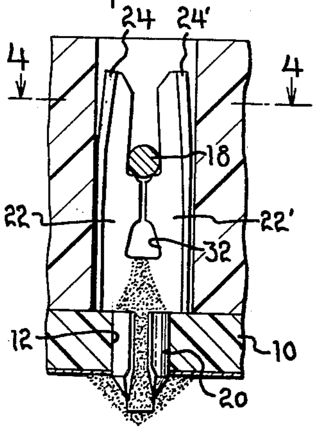
FIGURE 8 is a view similar to FIGURE 2, illustrating the connector inserted into a board and solder-dipped.

The body portion 22, 22′ of the connector has a large aperture 32 centrally located therein. This aperture will prevent the solder from wicking up through the ferrule onto the finger portions (FIGURE 8).

Figures 5, 6, 7:
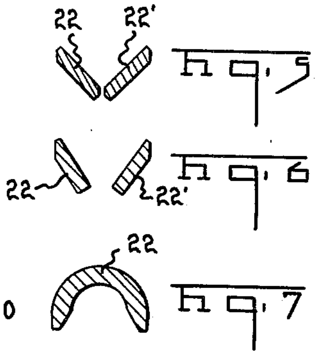
FIGURE 5 is a sectional view taken through plane 5—5 of FIGURE 2.
FIGURE 6 is a sectional view taken through plane 6—6 of FIGURE 2.
FIGURE 7 is a plan view taken through plane 7—7 of FIGURE 2.

The connector 14 is stamped out of sheet metal, as previously described. The ferrule-forming portion 20 is rolled up, and simultaneously the finger means 24, 24′ are bent at angles to each other to form the finished connector. This will, of necessity, dispose the body members 22, 22′ at something of an angle to each other, as shown in FIGURE 6.

The connector is then inserted into an aperture 12 in the printed circuit board 10. It may be retained in place either by an interference-fit, by staking one end of the ferrule, or by pinching the end of the ferrule to extend its diametrical length. The board is solder-dipped to retain the connector in place, and also make electrical contact between the connector and the desired circuits on the printed circuit board. It is noted that the aperture 32 prevents the solder from wicking up into the finger members 24, 24′.

When it is desired to insert a component 16 into a board 10, the component is placed between opposed connectors (FIGURE 1) and the lead wires 18 on the component are forced between the fingers 24, 24′. The lead-in angle 30, 30' on the front of the fingers facilitates their entry into the connector. The conductors force the fingers 24, 24' apart to permit insertion of the conductor. After the conductor passes the narrowest point between the two fingers, it snaps into place between the fingers and is firmly held therein. The conductor places a torsional deflection on the fingers 24, 24' to insure good contact pressure throughout the life of the connection. Should it be desired to remove the component, the conductor may be extracted from between the fingers, simply by lifting it upwardly. Because of the tapered relationship of the space between the fingers, the conductors may be inserted and extracted many times without damaging the fingers or losing contact pressure through repeated re-insertion.

It is noted that unless the solder is prevented from wicking up between the fingers, the fingers would be soldered together and would lose their resiliency, thus preventing insertion of a conductor and losing any tendency to provide contact pressure on the conductor. If the solder wicked up between the fingers with a component already inserted, the lead wire of the component would be soldered to the connector and would be impossible to extract the lead from the connector.

Changes in construction will occur to those skilled in the art and various apparently different modifications and embodiments may be made without departing from the scope of the invention. The matter set forth in the foregoing description and accompanying drawings is offered by way of illustration only.

I claim:

1. An electrical connector adapted to fit into an aperture in a printed circuit board comprising a base member adapted to be secured into said apertures, a body member extending outwardly from said base member, finger means extending outwardly from said body member, said finger means having continuous opposed inner edge surfaces, portions of which are relatively close together proximate the outer ends of said finger means and diverging in a direction toward said body member for receiving an electrical conductor means, intersections of said diverging edge surface portions with parallel planes normal to a longitudinal axis of said connector being parallel, said finger means having inwardly tapered surfaces at the outer ends to facilitate insertion of said conductor means between said finger means, portions of said edge surfaces spaced from said diverging portions defining an opening shaped to prevent solder from traveling from the base member to said finger means.

2. An electrical connector according to claim 1 wherein said finger means define members each of which is disposed at an angle with respect to the longitudinal axis of the connector.

References Cited by the Examiner

UNITED STATES PATENTS

| | | | |
|---|---|---|---|
| 810,664 | 1/06 | Mills | 339—275 X |
| 1,213,632 | 1/17 | Hammond | 339—257 |
| 1,552,382 | 9/25 | Breaznell | 339—258 |
| 1,595,031 | 8/26 | Steiner | 339—258 X |
| 2,120,396 | 6/38 | Domaleski | 339—258 X |
| 2,689,337 | 9/54 | Burtt et al. | 339—275 X |
| 2,766,438 | 10/56 | Kohler et al. | 339—258 |
| 2,871,551 | 2/59 | Harris | 339—221 X |
| 2,913,634 | 11/59 | Scoville | 339—220 X |
| 3,027,536 | 3/62 | Pasternak | 339—97 |

FOREIGN PATENTS

| | | |
|---|---|---|
| 642,246 | 6/62 | Canada. |
| 53,111 | 8/90 | Germany. |
| 286,346 | 2/28 | Great Britain. |
| 816,694 | 7/59 | Great Britain. |
| 883,203 | 11/61 | Great Britain. |

JOSEPH D. SEERS, *Primary Examiner.*